(12) United States Patent
Duer

(10) Patent No.: US 10,328,374 B2
(45) Date of Patent: Jun. 25, 2019

(54) METHOD FOR PRODUCING A CONTOURED FILTER ELEMENT AND FILTER ELEMENT ARRANGEMENT

(71) Applicant: Sefar AG, Heiden (CH)

(72) Inventor: Hansjoerg Duer, Schwarzach (AT)

(73) Assignee: Sefar AG, Heiden (CH)

( * ) Notice: Subject to any disclaimer, the term of this patent is extended or adjusted under 35 U.S.C. 154(b) by 361 days.

(21) Appl. No.: 15/122,251

(22) PCT Filed: Feb. 9, 2015

(86) PCT No.: PCT/EP2015/052597
§ 371 (c)(1),
(2) Date: Aug. 29, 2016

(87) PCT Pub. No.: WO2015/132047
PCT Pub. Date: Sep. 11, 2015

(65) Prior Publication Data
US 2016/0367930 A1 Dec. 22, 2016

(30) Foreign Application Priority Data
Mar. 6, 2014 (EP) ..................................... 14158084

(51) Int. Cl.
*B62D 3/08* (2006.01)
*B01D 46/00* (2006.01)
(Continued)

(52) U.S. Cl.
CPC ......... *B01D 46/16* (2013.01); *B01D 46/0001* (2013.01); *B01D 46/10* (2013.01);
(Continued)

(58) Field of Classification Search
CPC .... B01D 46/0001; B01D 46/10; B01D 46/16; B01D 46/54; B01D 2265/02; B01D 2279/35; B01D 2279/45; B26D 3/085
See application file for complete search history.

(56) References Cited

U.S. PATENT DOCUMENTS 4,120,715 A * 10/1978 Ockwell ................ B01D 46/10
156/252
4,600,420 A * 7/1986 Wydeven ............... B01D 46/10
264/136
(Continued)

FOREIGN PATENT DOCUMENTS

CN          202803002 U     3/2013
DE     10 2004 046 164 A1   4/2006
(Continued)

OTHER PUBLICATIONS

Translation of the International Preliminary Report on Patentability of the International Searching Authority; PCT/EP/2015/052597 dated Aug. 2, 2016.
(Continued)

*Primary Examiner* — Jason M Greene
(74) *Attorney, Agent, or Firm* — Studebaker & Brackett PC

(57) ABSTRACT

The invention relates to a method for producing a contoured filter element, according to which method at least one filtering medium is applied to a flat backing material and is detachably secured thereto. The filtering medium is cut out on the backing material to form the contoured filter element and said contoured filter element can be detached from the backing material for use. The invention also relates to a filter element arrangement produced by means of this method.

13 Claims, 1 Drawing Sheet

(51) Int. Cl.
*B01D 46/10* (2006.01)
*B01D 46/16* (2006.01)
*B26D 3/08* (2006.01)

(52) U.S. Cl.
CPC .......... *B26D 3/085* (2013.01); *B01D 2265/02* (2013.01); *B01D 2275/20* (2013.01)

(56) References Cited

U.S. PATENT DOCUMENTS

| | | | | |
|---|---|---|---|---|
| 5,912,369 | A * | 6/1999 | Reeves | B01D 46/10 55/385.1 |
| 7,976,606 | B1 * | 7/2011 | Nicholson | B01D 46/10 55/385.1 |
| 2010/0237006 | A1 * | 9/2010 | Brentnall | B01D 46/10 210/505 |
| 2011/0138762 | A1 * | 6/2011 | Ueki | B01D 46/54 55/508 |
| 2011/0168022 | A1 | 7/2011 | Furuyama | |

FOREIGN PATENT DOCUMENTS

| | | |
|---|---|---|
| EP | 2 305 458 A1 | 4/2011 |
| JP | 2002-085927 A | 3/2002 |

OTHER PUBLICATIONS

International Search Report issued in PCT/EP2015/052597, dated Jun. 1, 2015.

An Office Action issued by the State Intellectual Property Office of China on Feb. 13, 2018, which corresponds to Chinese Patent Application 201580012379.0 and is related to U.S. Appl. No. 15/122,251.

An Office Action issued by the State Intellectual Property Office of China on Feb. 13, 2018, which corresponds to Chinese Patent Application 201580012379.0 and is related to U.S. Appl. No. 15/122,251; with English Translation.

* cited by examiner

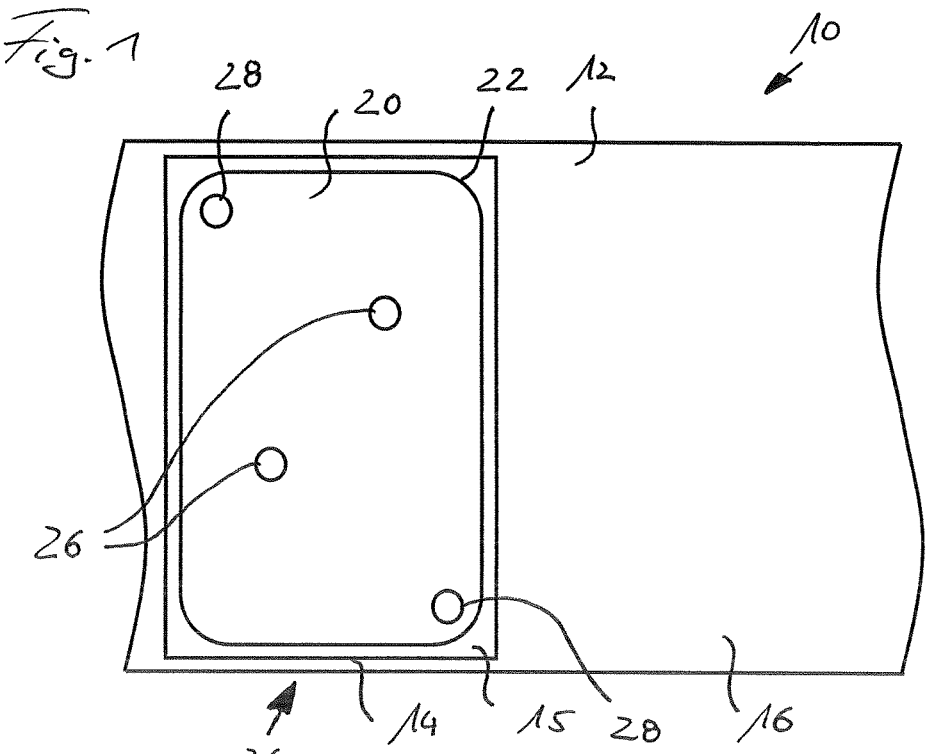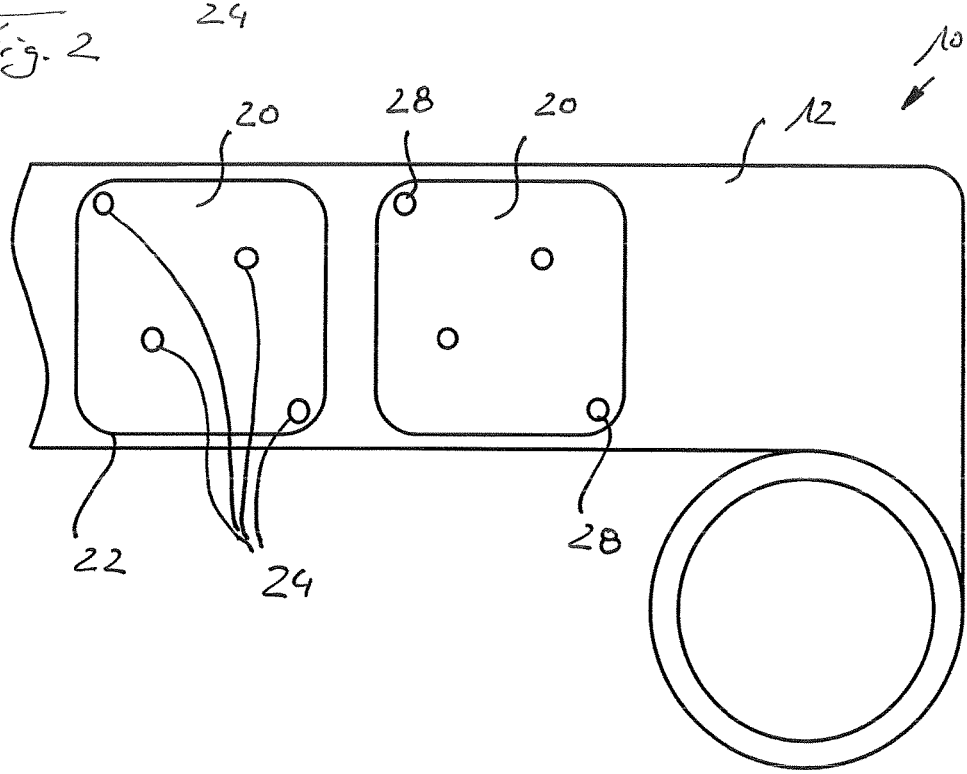

METHOD FOR PRODUCING A CONTOURED FILTER ELEMENT AND FILTER ELEMENT ARRANGEMENT

The invention relates to a method according to the preamble to claim 1 for producing a contoured filter element and to a filter element arrangement according to the preamble to claim 8.

Filter elements are used to separate particles from a liquid or a gas. Filter elements are produced from a filtering medium which can typically be a filter fabric, a filter fleece or a filter membrane. The filtering medium itself is produced from a strip of material or in large sections which are subsequently divided and cut into the desired filter element.

The production and cutting of the filtering medium to form the filter element are usually carried out by a specialist filtering medium producer. The contoured filter elements are then generally delivered to an end processor which further processes the filter elements, in particular incorporating them into a frame or a casing. Such products can for example be air, oil or liquid filters for motor vehicles. Such filter devices for motor vehicles are required in large numbers and are therefore frequently produced in an extensively automated process.

Due to the delicate structure of the relatively thin and flexible filter element the transport and storage thereof as well as the handling in automated further processing are problematic. In the event of improper handling the delicate filter element may be damaged or deformed, with the result that during end processing an impairment arises or the filter produced is defective.

Likewise the soft structure with an unstable shape of the filtering medium can lead already during the cutting of the filter element to undesired contour deviations.

EP 2 305 458 A1 relates to ventilation filters and to a method for producing them. In a multilayer structure, which comprises a carrier layer, an adhesive layer and a filter material, a filter element is produced, of which the outer contour is produced by means of a cutting tool.

DE 10 2004 046164 A1 relates to porous membrane film, on the lower side of which an adhesive layer is provided, which is provided with hole-like recesses. To produce the membrane filter the two layers are applied to a carrier which has an adhesive repelling layer.

US 2011/0168022 A1 relates to a filter holder which enables air-permeable filters to be detached from a backing strap without increasing the tension which is applied to the backing strap. For this it is proposed to facilitate the air-permeable filters through corresponding shaping, in particular forming a tapering to a tip in the detachment direction.

It is the object of the invention to indicate a method for producing a contoured filter element and a filter element arrangement which facilitate a particularly reliable machining and processing of a filter element.

The object is achieved on the one hand with a method having the features of claim 1 and on the other hand with a filter element arrangement having the features of claim 8. Preferred exemplary embodiments of the invention are indicated in the respective dependent claims.

According to the invention a method for producing a contoured filter element is provided, wherein at least one filtering medium is applied to a flat backing material and detachably secured to it and the filtering medium is cut on the backing material to form the contoured filter element, wherein the contoured filter element can be released for usage of the backing material.

A core idea of the invention is that already during the production of the contoured filter element a flat backing material is to be provided, to which a starting filtering medium is detachably fastened. The filtering medium can be an optionally pre-cut filtering medium piece, for example a filter fabric, a filter fleece, a filter membrane, a combination thereof or another filter medium. The flat backing material stabilises and secures the soft and flexible filtering medium so that a precisely shaped contouring can be carried out. The thus produced contoured filter element can for example remain on the backing material until further processing. This provides protection against damage or an undesirable deformation of the filter element. In addition this arrangement according to the invention of a contoured filter element on the backing material allows reliable handling, due to the improved shape stability, in the further processing of the filter element to a filter. This is advantageous in particular for automated methods, for example to produce an air, oil or liquid filter, as used in a multitude of applications in a motor vehicle.

In principle the filter element and backing material can be cut through. According to a preferred embodiment of the invention a cutting device is used for cutting, through which the filter element is cut at least in areas, while the backing material remains uncut. The cutting device which can have a laser or a cutting knife is thereby adapted to cut only the filter element. The thin backing material, which can in principle be cut, is not thereby cut. The cutting residue produced by carrying out such contouring can be removed from the backing material, while the contoured filter element remains on the backing material.

According to a further variant of the invention it is advantageous that a cutting device is used for cutting, through which the filter element together with the backing material are cut at least in areas. The cutting device is configured in this case or to cut this area so that both the filter element and also the thin backing material are cut through. This is advantageous for example when cutting out holes from the filter element as the cutting residue of the filter element with the backing material cut out is more stable in its shape and can thus be removed more easily and reliably.

According to a useful embodiment of the method according to the invention it is provided that the filtering medium is applied as a strap or in a plurality of pieces to a continuous backing material, and that during cutting of the filtering medium the backing material remains continuous. The filtering medium can be formed with the same shape as the strap-form backing material and thus substantially cover one side of the backing material. The cutting residue can be easily removed as a connected strap or network. Pre-cut pieces of the filtering medium can be applied to the backing material in a material-saving way. In this secured and stabilised position precisely shaped cutting can be carried out to achieve the desired contour. The continuous backing material, which is in the form of a strap, can thus be used to transport and store a plurality of filter elements.

It is provided according to the invention that to form an outer contour of the filter element the filtering medium is cut, wherein the backing material remains uncut along the outer contour. The backing material thus projects laterally with respect to the outer contour of the filter element and protects it during transport and storage.

Furthermore it is provided according to the invention that to form an inner contour of the filter element at least one hole is cut into the filter element, wherein the filter element and the backing material are cut through along the inner contour.

In this way an inner cutting residue can be removed with great reliability due to the backing material residue still being attached. A plurality of holes and openings are preferably incorporated into the filter element to form an inner contour of this filter element.

For further processing of the filter element it is particularly advantageous to cut at least one positioning hole into the filter element and/or the backing material, which is provided for positioned removal of the filter element from the backing material. During the further processing of the filter element, the positioning hole essentially has the function, by interacting with a positioning pin, to bring the filter element and/or the backing material into a desired position. The increased material strength due to the hole through the filter element and the backing material guarantees a reliable positioning. In this defined position the filter element can then be gripped with exact positioning and detached from the backing material for further processing. The positioning holes can also be incorporated only into the carrier element, for example in the edge region beside the filter elements.

In principle, different cutting devices, in particular cutting or stamping knives with stationary or rotating blade, can be used for contouring. A particularly precise contouring is achieved according to a further development of the invention in that the cutting device has a laser for cutting. The laser can thereby be controlled so that it cuts only through the filter medium in some areas and through the filter medium together with the thin backing material in some areas.

According to the invention a filter element arrangement is provided with a flat backing material, on which at least one contoured filter element is detachably arranged, wherein the filter element is formed on the backing material by cutting a filtering medium applied to the backing material. The previously described advantages with respect to protected transport and storage as well as a reliable and position-precise further processing of the filter element are achieved with the filter element arrangement. This filter element arrangement is preferably produced by a method which has previously been described.

This filter element arrangement is advantageously further developed in that the flat flexible backing material projects over a cut outer contour of the filter element. Through this projection, in particular the delicate edge or the delicate outer contour of the filter element is protected by the backing material.

Furthermore it is advantageous according to an embodiment of the invention that the filter element has an inner contour with at least one hole, wherein the hole is cut into the filter element and the backing material. This allows reliable production of an inner contour with secure removal of an inner cutting residue.

A good transport and storage capacity is achieved according to a further development of the invention in that the backing material is a flexible strap which is rolled up with the at least one applied cut filter element for transportation. It is particularly useful if a plurality of contoured filter elements are arranged one behind the other on the flexible strap. This roller-type filter element arrangement can be used particularly advantageously in an automated series production of filter devices.

The backing material for the filter arrangement according to the invention is flexible and thin, wherein the wall thickness can be between a few millimeters to a few hundredths of a millimeter. Textile materials, such as fabric, fleeces, etc., or films, can be used as flexible backing material. In principle the use of a metal film is also possible.

According to the invention a particularly useful and cost-effective backing material is a plastic film.

To efficiently secure the filter medium on the backing material it is provided according to a further development of the invention that the backing material is provided with an adhesive layer, from which the filter element can be detached easily and without resistance. The backing material is preferably a single-use material and disposal thereof is carried out after the filter element has been removed.

The invention will be described below by reference to preferred exemplary embodiments, which are shown schematically in the attached drawings, in which:

FIG. 1 shows a schematic top view of a first filter element arrangement according to the invention; and FIG. 2 shows a schematic view of a second filter element arrangement according to the invention.

According to FIG. 1 a filter element arrangement 10 is shown, wherein a leaf-shaped or a strap-form plastic film is provided as backing material 12. An adhesive layer 16 is provided on an upper side of the backing material 12, the adhesive layer 16 facilitating an easy and detachable sticking of a filter medium 14 on the backing material 12.

The filtering medium 14 used in the exemplary embodiment according to FIG. 1 is a rectangular leaf of a filter fabric or a filter fleece. This pre-cut rectangular filtering medium 14 is applied to the adhesive layer 16 of the backing material 12 for cutting and forming a filter element 20. Trimming of the filtering medium 14 is then carried out on the backing material 12 by means of a cutting device (not shown). A frame-like trimming residue 15 is hereby cut off the filtering medium 14. With this cutting process exclusively the material of the filtering medium 14 is cut, but not the backing material 12 lying below it. The trimming residue 15 can be removed from the backing material 12 by hand or by an automated removal device while the thus trimmed filter element 20 remains on the backing material 12.

At the same time or at a separate time from the trimming to form the outer contour 22, holes 26, 28 are cut in by means of the cutting device to form an inner contour 24. The outer contour 22 and the inner contour 24 are formed in a precise position relative to each other.

At least the positioning holes 28 lying in the outer edge region of the filter element 20 are thereby cut so that both the material of the filter element 20 and also the backing material 12 lying below it are cut through. The cut-out disc-like pieces of the holes as cutting residue are thus on the one hand from the material of the filter element and on the other hand from the backing material arranged below it through adhesion and cut out. The cutting residue is thus more stable in shape and can be reliably removed. The positioning holes 28 thus projecting through the filter element 20 and the backing material 12 can be used in the further processing of the filter element 20 for an exact rest positioning in an automatic production machine. Through corresponding engagement of suitable centring pins the filter element arrangement 10 can thus be reliably transported and arranged with precise positioning. The positioning holes 28 can, besides this positioning function, also have a function in the finished filter element 20, for example for the passage of ducts or shafts in a filter device.

In addition, to form the inner contour 24 further holes 26 can also be cut into the filter element 20. These further holes 26 are not used for a positioning function but instead are designed corresponding to the desired shape and function of the filter element 20. These further holes 26 can be cut like the outer contour 22 so that exclusively the material of the filter element 20, but not the backing material 12 lying below it, is cut through. For efficient removal of the cutting residue when cutting the holes 26 it is useful, however, as in the case of the previously described positioning holes 28, that when cutting the holes 26 the backing material 12 lying below is also cut through.

According to FIG. 2 a second filter element arrangement 10 according to the invention is shown which corresponds extensively to the previously described filter element arrangement 10 according to FIG. 1. In the filter element arrangement 10 according to FIG. 2 the backing material 12 is formed as a strap, on which a plurality of filter elements 20 are arranged and cut. For the sake of clarity, only two filter elements 20 are shown in FIG. 2. In addition in the illustration according to FIG. 2 the cutting residue 15 that arose during cutting and forming the outer contour 22 has already been removed.

It can be seen in particular from FIG. 2 that the positioning holes 28, which form a part of the inner contour 24, are arranged along the outer edges of the strap-form backing material 12 in the respective filter elements 20. This arrangement of the positioning holes 28 can thus form a grid, which is useful for example for feeding the filter elements 20 on the strap-form backing material 12 to automated production installations. The strap-form backing material 12 according to FIG. 2 can be rolled up into a roll for better storage and simplified transport. If it is rolled up in this way, it can be useful that the adhesive layer 16 is not applied over a large area on an upper side of the backing material 12, but instead is only located at the respective positions of the filter elements 20.

Alternatively, a separating film could also be provided for rolling up. Furthermore the filter medium can be applied not in pre-cut pieces but instead as a strap to the strap-form backing material 12.

The invention claimed is:

1. A method for producing contoured filter elements, wherein
at least one filtering medium is applied to a strap-form backing material and detachably secured thereto, and
the filtering medium is cut on the strap-form backing material to form the contoured filter elements, wherein the contoured filter elements can be detached for use from the strap-form backing material,
wherein
the strap-form backing material is provided,
to form an outer contour of the filter elements the filtering medium is cut on the strap-form backing material, wherein the strap-form backing material remains uncut along the outer contour of the filter elements, and
to form an inner contour of the filter elements at least one hole is cut into the filter elements, wherein the filter elements and the strap-form backing material are cut along the inner contour.

2. The method according to claim 1, wherein
a cutting device is used for cutting, through which the filter elements are cut at least in areas while the strap-form backing material remains uncut.

3. The method according to claim 1, wherein
a cutting device is used for cutting, through which the filter elements are cut together with the strap-form backing material at least in areas.

4. The method according to claim 1, wherein
the filtering medium is applied as a strap or in a plurality of pieces to the continuous strap-form backing material, and
during cutting of the filtering medium the strap-form backing material remains continuous.

5. The method according to claim 1, wherein
the inner contour comprises a positioning hole, which is provided for a positioned removal of the filter elements from the strap-form backing material.

6. The method according to claim 1, wherein
the cutting residue produced during contouring is removed from the strap-form backing material while the contoured filter elements remain on the strap-form backing material.

7. The method according to claim 2, wherein
the cutting device has a laser for cutting.

8. A filter element arrangement with a strap-form backing material, on which a plurality of contoured filter elements are detachably arranged, wherein the filter elements are formed by cutting a filtering medium applied to the strap-form backing material,
wherein
the filter elements are formed on the strap-form backing material by cutting with an outer contour, wherein the strap-form backing material remains uncut along the outer contour of the filter elements, and
the filter elements have an inner contour with at least one hole, wherein the hole is cut into the filter elements and the strap-form backing material.

9. The filter element arrangement according to claim 8, wherein
the strap-form backing material projects over a cut outer contour of the filter elements.

10. The filter element arrangement according to claim 8, wherein
the inner contour has at least one positioning hole, which is provided for a positioned removal of the filter elements from the strap-form backing material.

11. The filter element arrangement according to claim 8, wherein
the strap-form backing material is a flexible strap, which is rolled up for transport with the at least one cut filter element applied.

12. The filter element arrangement according to claim 8, wherein
the strap-form backing material is a plastic film.

13. The filter element arrangement according to claim 8, wherein
the strap-form backing material is provided with an adhesive layer, from which the filter elements can be detached without residue.

* * * * *